United States Patent
Neilan et al.

(10) Patent No.: US 10,395,226 B2
(45) Date of Patent: Aug. 27, 2019

(54) MAINTAINING SECURE ACCESS TO A SELF-SERVICE TERMINAL (SST)

(71) Applicant: NCR Corporation, Duluth, GA (US)

(72) Inventors: Michael James Neilan, Scotland (GB); Kevin Horgan, Scotland (GB)

(73) Assignee: NCR Corporation, Atlanta, GA (US)

( * ) Notice: Subject to any disclaimer, the term of this patent is extended or adjusted under 35 U.S.C. 154(b) by 11 days.

(21) Appl. No.: 14/169,845

(22) Filed: Jan. 31, 2014

(65) Prior Publication Data

US 2015/0220900 A1 Aug. 6, 2015

(51) Int. Cl.
  *G06Q 20/18* (2012.01)
  *G07F 19/00* (2006.01)

(52) U.S. Cl.
  CPC .......... *G06Q 20/18* (2013.01); *G07F 19/209* (2013.01); *G07F 19/211* (2013.01)

(58) Field of Classification Search
  None
  See application file for complete search history.

(56) References Cited

U.S. PATENT DOCUMENTS

| | | | | |
|---|---|---|---|---|
| 8,589,020 B1* | 11/2013 | Angus et al. | ................. | 701/29.6 |
| 2003/0231102 A1* | 12/2003 | Fisher | ................. | G07C 9/00103 340/5.73 |
| 2009/0327720 A1* | 12/2009 | Cathro | ................. | G06F 21/6209 713/168 |
| 2011/0296194 A1* | 12/2011 | Herkes | .................... | G06F 21/34 713/185 |
| 2015/0106925 A1* | 4/2015 | Maccari | ................. | G06Q 20/18 726/22 |
| 2016/0014111 A1* | 1/2016 | Kurz | ....................... | G06F 21/44 713/172 |

* cited by examiner

*Primary Examiner* — Scott A Zare

(74) *Attorney, Agent, or Firm* — Schwegman, Lundberg & Woessner

(57) ABSTRACT

A memory device is interfaced to a SST; an identifier and, optionally, an invalid identifier list are received from the device. The invalid identifier list is updated to the SST when the invalid identifier list is a more recent version of a SST invalid identifier list. The identifier is invalidated when the identifier is matched in the invalid identifier list or when an expiration date associated with the identifier has expired. When the identifier is invalid, access to administrative features of the SST is denied; and when the identifier is valid access to the administrative features is granted.

12 Claims, 4 Drawing Sheets

US 10,395,226 B2

MAINTAINING SECURE ACCESS TO A SELF-SERVICE TERMINAL (SST)

BACKGROUND

Increasingly, enterprises are deploying Self-Service Terminals (SSTs) at various locations for use by consumers. The locations can include financial institutions, grocery stores, retail stores, government venues, entertainment venues, gaming venues, transportation venues, and the like.

The SSTs save the enterprises money by reducing onsite support staff and increasing the operational throughput by servicing consumers more efficiently.

However, the SSTs are electromechanical devices that include a variety of hardware and software modules, which do fail on occasion requiring onsite service. Moreover, the SSTs can, from time-to-time, require new modules, updated modules, or require that some modules be removed from the SSTs. Thus, a support staff of engineers/technicians must be maintained by the enterprises.

As a result, the SSTs have security interfaces to prevent hackers or intruders from gaining unauthorized access to the SSTs. Perhaps the greatest risk of a security breach to the SSTs is disgruntled or former employees of the enterprise that are already equipped with the resources to gain access to the SSTs.

One type of SST where security is of utmost importance is an Automated Teller Machine (ATM). Moreover, ATMs are often placed in a variety of locations, some of which are entirely unrelated to a retail establishment to which the ATMs are in proximity to, such as entertainment venues, parking lots of retail establishments, and the like. So, security becomes even more challenging because someone can appear to be properly servicing an ATM in a location where the location staff may not even question what is taking place.

In the ATM scenario, an ATM is often serviced by a service engineer inserting a secure Universal Serial Port (USB) device having a secure key, which is used for authentication by the ATM security software to provide diagnostic access to the ATM.

Once authenticated, the engineer can access administrative features of the ATM, such as executing diagnostic routines, part/module validation, and authorization to dispense currency (where configured). Typically, the secure key on the USB device (often referred to as a key dongle) includes an expiration date, such that when that secure key expires the security software will prevent access to the administrative features of the ATM.

However, it is not uncommon for a service engineer to leave the employment of the enterprise associated with servicing the ATM before the key dongle (still in possessing of the parting employee) becomes unauthorized for use by that service engineer. This leaves a security hole where the ex-employee can gain access to the ATM.

SUMMARY

In various embodiments, methods and system for maintaining secure access to a Self-Service Terminal (SST) are presented.

According to an embodiment, a method for maintaining secure access to a SST is provided. Specifically, in an embodiment, a SST detects a secure device presented thereto. Next, information from the secure device is obtained relating to other secure devices that are to be denied access to the SST. Finally, a determination is made as to whether the obtained information is to be updated to the SST.

DETAILED DESCRIPTION

Figure 1:
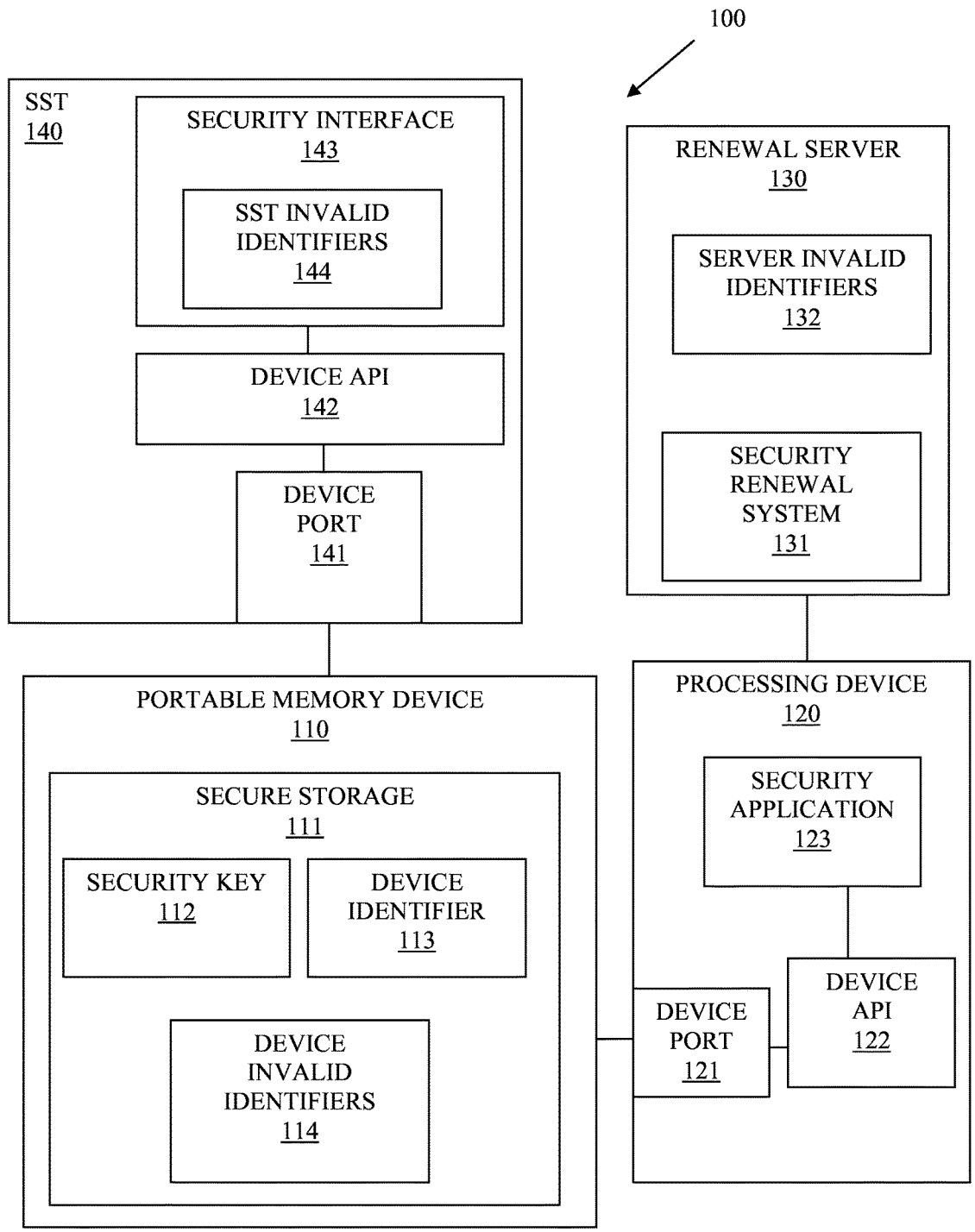
FIG. 1 is a diagram of an example architecture for practicing maintaining secure access to a Self-Service Terminal (SST), according to an example embodiment.

FIG. 1 is a diagram of an example architecture 100 for maintaining secure access to a Self-Service Terminal (SST), according to an example embodiment. The SST 140 is shown schematically in greatly simplified form, with only those components relevant to understanding of this embodiment being illustrated. The same is true for the portable memory device 110, the processing device 120, and the renewal server 130. The various components are illustrated and the arrangement of the components is presented for purposes of illustration only. It is to be noted that other arrangements with more or less components are possible without departing from the secure deactivation of SST security identifiers presented herein and below.

The techniques, methods, and SST 140 presented herein and below for maintaining secure access to a SST can be implemented in whole or in part in one, all, or some combination of the components shown with the architecture 100. The techniques and methods are programmed as executable instructions in memory and/or non-transitory computer-readable storage media and processed on one or more processors associated with the components (may also be referred to as "modules").

In the embodiment for the architecture 100, the methods and SST 140 are implemented as one or more hardware and software components of an Automated Teller Machine (ATM) security system.

Specifically, the architecture 100 permits secure deactivation of one or more ATM security identifiers that are installed on a portable memory device 110 (a Universal Serial Bus (USB) key dongle 110 (herein after key dongle 110)). This can be achieved by utilizing invalid identifiers 114, 132, and 144 that are encrypted and securely updated on the key dongle 110 each time a service engineer renews an expired device identifier 113 with a security renewal system 131. Moreover, each time the service engineer accesses the ATM 140, the security interface 143 of the SST 140 checks its ATM invalid identifiers 144 to determine if the device identifier 113 is still valid. If the device invalid identifiers 114 are a more recent version than the ATM invalid identifiers 144, then the security interface 143 acquires the device invalid identifiers 114 from the key dongle 110 (using device Application Programming Interface (API) 142). Using this technique, the ATM 140 does not require continual updates for server invalid identifiers 132 over the SST's network (not shown in the FIG. 1 and which the enterprise associated with servicing the ATM 140 may have no or limited access to). In essence, the server invalid identifiers 132 are communicated by the service engineers servicing the SST 140, such that no Internet access or formal distribution mechanism is required. The techniques herein provide a mechanism for providing an up-to-date list of invalid identifiers 114, 132, and 144, which heretofore have not existed and provide mechanisms for efficient maintenance and management of those invalid identifiers 111, 132, and 144.

The architecture 100 is now discussed in greater detail along with its components in view of the discussion above. It is to be noted that the methods and ATM 140 presented herein are not just limited to ATM solutions; that is, any SST terminal (kiosk, etc.) for any industry can benefit from the security mechanisms discussed herein.

The architecture 100 includes a key dongle 110, a laptop personal computer 120, a renewal server 130, and an ATM 140. The key dongle 110 includes secure storage 111. The secure storage includes a security key 112, a device identifier 113, and invalid identifiers 114. The laptop personal computer 120 includes a device port 121, a device API 122, and a security application 123. The renewal server 130 includes a security renewal system 131 and server invalid identifiers 132. The ATM 140 includes a device port 141, a device API 142, and a security interface 143 having ATM invalid identifiers 144.

The key dongle 110 includes secure memory 111 storing a security key 112, a device identifier 113, and invalid identifiers 114 (may also be referred to as "device invalid identifiers 114"). The contents of the secure storage 111 can be encrypted and signed within the key dongle 110. Moreover, device identifier 113 is a unique serial number (or other unique identifier) that includes a modifiable attribute for an expiration date (can be utilized in the secure storage 111 separate from the device identifier 113 as well). It is noted that in some cases the device identifier 113 can include an issuance date along with a time-to-live attribute, such that the expiration date can be calculated at the time of access to the ATM 140 using the issuance date and the time-to-live attribute.

The key dongle 110 is initially updated by an engineer via laptop personal computer 120 by interfacing the key dongle 110 to a device port 121 of the laptop personal computer 120 and accessing a security application 123 that makes a secure network connection to the renewal server 130 for access to the security renewal system 131 (discussed below). This is done without interaction of the service engineer whenever the service engineer interfaces the key dongle 110 to the device port 121 of the laptop personal computer 120 when the laptop personal computer 120 has a network connection (the security application 123 has a kernel mode portion that detects the event and connects to the enterprise server 130). The device port 121 is a USB interface port 121.

Once the key dongle 110 is interfaced to the renewal server 130 and has access to the security renewal system 131, the service engineer can acquire a renewed expiration date attribute or a creation date with time-to-live attribute for the device identifier 113 of the key dongle 110. This too can happen transparently, such that the service engineer is unaware of actions being taken by the security renewal system 131 and the security application 123 with respect to the key dongle 110. The security application 123 uses device API 122 to interface with the key dongle 110.

The renewal server 130 is a processing environment that executes and provides access to the security renewal system 131. The renewal server 130 can be a secure cloud environment that spans multiple physical locations and creates a single logical processing environment that represents the renewal server 130. In another case, the renewal server 130 is an enterprise server located at a specific physical location. The renewal server 130 includes a variety of security mechanisms and authentication mechanisms to ensure secure access to the renewal system 131.

The renewal system 131 is an existing renewal system deployed by ATM servicing organizations that is enhanced with the teachings provided herein to distribute and manage the server invalid identifiers 132 (may also be referred to as "server invalid identifier list 132"). So, an interface mechanism (not shown in the FIG. 1) permits an administrator to update the server invalid identifier list 132, which the security renewal system 131 distributes each time a key dongle 110 is interfaced to the security renewal system 131. Moreover, the security renewal system 131 also distributes expiration and/or creation with time-to-live attributes for the device identifier 113 of the key dongle 110.

The ATM 140 is a device capable of dispensing (and some ATMs, accepting) currency and performs a variety of financial transactions for a consumer. The ATM 140 includes conventional ATM components but is also enhanced with a modified and enhanced version of the security interface software module 143 (as discussed herein below).

The ATM 140 includes a USB port 141, a device API 142, and a security interface software module 143 having ATM invalid identifiers 144.

The security interface software module 143 includes conventional security mechanisms for key validation and is further enhanced herein to provide a mechanism for checking the device invalid identifier list 114 on the key dongle 110 when the key dongle 110 is interfaced to the ATM 140 via the USB port 141. When the security interface software module 143 detects that the ATM invalid identifier list 144 maintained on the ATM 140 has a version number that precedes a version number associated with the device invalid identifier list 114 on the key dongle 110 (that is, the ATM invalid identifier list 144 is older than the device invalid identifier list 114), the security interface software module 143 requests the device invalid identifier list 114 (using device API 142 to access the secure storage 111 of the key dongle 110) and replaces its version of the ATM invalid identifier list 144 with the device invalid identifier list 114.

During operation, the security interface software module 143 detects a connection by the key dongle 110. The device API 142 is used to interface with the key dongle 110 to access (read and write) the secure storage 111. Typical, authentication of the device identifier 113 with the ATM 140 then occurs. For example, a message is encrypted and sent to the key dongle 110. The message can only be decrypted and an appropriate response provided back to the ATM 140 using the security key 111 of the key dongle 110. Assuming, the key dongle 110 is authenticated to the ATM 140. The ATM 140 uses the device API 142 to request the device identifier 113 with its expiration attribute. If the expiration date for the expiration attribute has expired, then access to the administrative features of the ATM 140 is either denied or restricted to a small subset of features.

The security interface 143 then performs additional authentication that has heretofore not been done. Specifically, the security interface 143 first checks to see if there is a match on the device identifier 113 in the ATM invalid identifier list 144. Again, if there is a match access to the administrative features of the ATM 140 is either denied or restricted to a small subset of features. If there is no match, then the ATM 140 uses the device API 142 to request the device invalid identifier list 114 from the secure storage 111 of the key dongle 110.

It is noted, that it may be the entire device invalid identifier list 114 may not have to be requested from the key dongle 110 at this point in the processing, if the device API 142 permits checking metadata associated with the device invalid identifier list 114; the metadata being a modified date and/or version number for the device invalid identifier list 114. It may also be that the first few bytes of where the device invalid identifier list 114 is known to be located in the secure storage 111 (known by configuration in the security interface 143) can be requested to include a version number for the device invalid identifier list 114.

When the security interface 143 determines that the ATM invalid identifier list 144 is more up-to-date than the device invalid identifier list 114, the security interface 143 grants access to the service engineer to the administrative features of the ATM 140 (assuming the other checks discussed were met as well)

When the security interface 143 determines that the device invalid identifier list 114 is more up-to-date than the ATM invalid identifier list 144, the security interface 143 replaces the ATM invalid identifier list 144 with the device invalid identifier list 114. This may require the security interface 143 making a request for the device invalid identifier list 114, in some embodiments as discussed above. Optionally, the security interface may use the device API 142 to request that the key dongle 110 replace the device identifier list 114 with the ATM identifier list 144 within the secure storage 111 of the key dongle 100. Next, the security interface 143 checks the device identifier 113 to see if a match exists in the current ATM device identifier list 144. If a match occurs, access to the administrative features is denied or restricted. If no match occurs, the service engineer is granted access to the administrative features of the ATM 140.

In an embodiment, the portable memory device 110 can be any device having memory that can be accessed when interfaced to the SST 140. For example, the portable memory device 110 can be a smart phone, tablet, laptop, or wearable processing device having a secure mechanism to distribute encrypted keys.

In an embodiment, the device ports 121 and 141 are wireless interfaces supporting any wireless connection between the device 110 and the processing device 120. In other embodiments, the device ports 121 are 141 are Ethernet communication ports or any other type of communication port.

In an embodiment, the processing device 120 and the portable memory device 110 are integrated within the same device, such as a phone, tablet, laptop, wearable processing device, and the like.

In some embodiments, the SST 140 can be a kiosk as well.

In an embodiment, when an invalid identifier 144 is encountered indicating that an attempted access was made to the ATM 140, the security interface 143 can note such an attempt by writing data to the key dongle 110. Then, when the key dongle 110 is again interfaced to the renewal server 130, the data (now residing on the key dongle 110) can be retrieved to identify the name/number of the service engineer that made the attempt and perhaps other information as well, such as date and time of attempted access, ATM 144 identifier, etc.

The architecture 100 demonstrates a mechanism for accounting for detecting device identifiers 113 that may not have expired but that are nonetheless invalid by maintenance and processing of invalid identifier lists 113, 132, and 144. Furthermore, the architecture 100 demonstrates an efficient mechanism for piecemeal updating the ATM 140 with the invalid identifier lists 113, 132, and 144 without having to access the ATM's 140 home network (for which access may not exist or for which access may be restricted).

Figure 2:
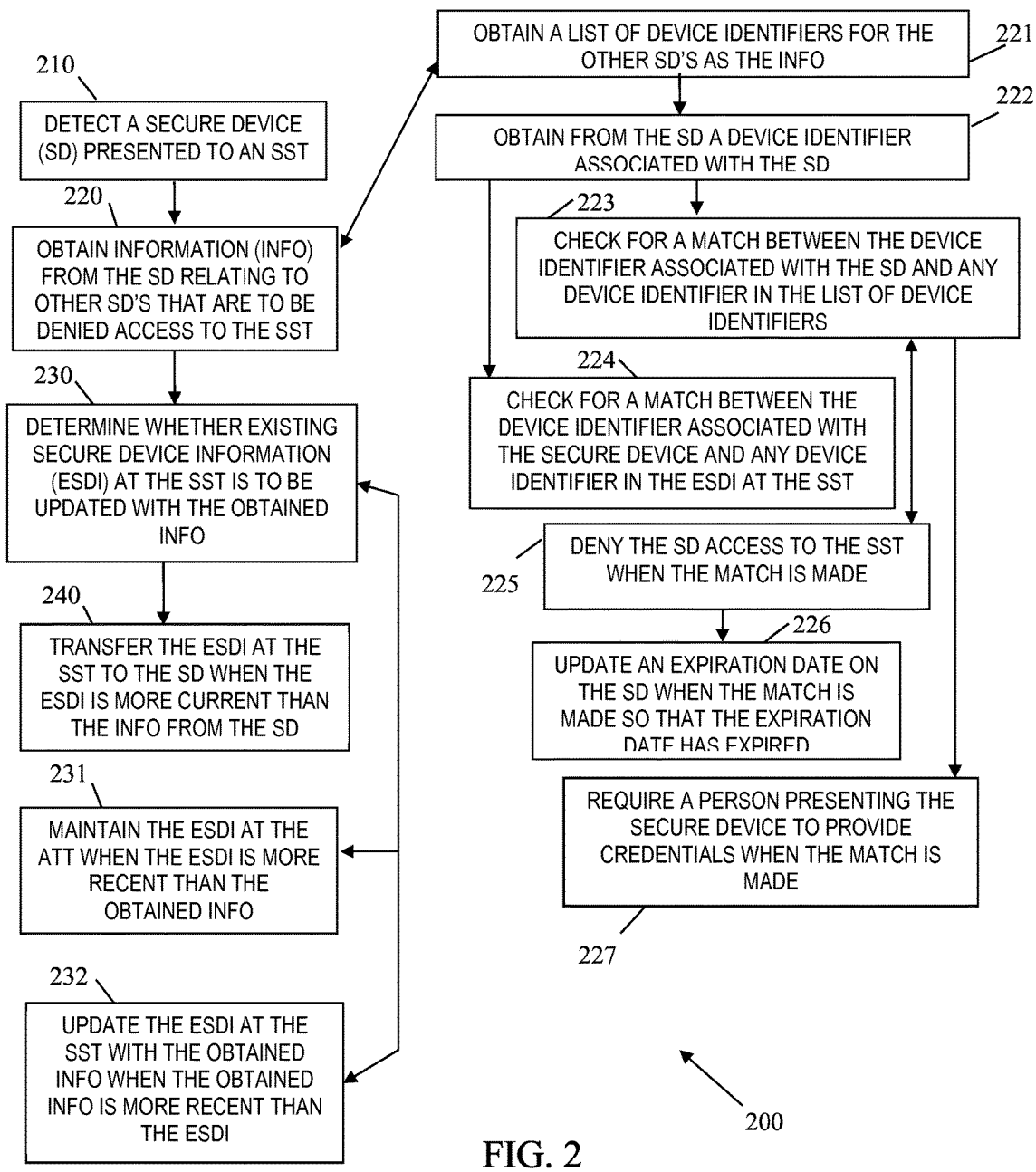
FIG. 2 is a diagram of a method for maintaining secure access to a SST, according to an example embodiment.

FIG. 2 is a diagram of a method 200 for maintaining secure access to a SST, according to an example embodiment. The software module(s) that implements the method 200 is referred to as a "SST access manager." The SST access manager is implemented as executable instructions programmed and residing within memory and/or a non-transitory computer-readable (processor-readable) storage medium and executed by one or more processors of a device. The processors of the device that executes the SST access manager are specifically configured and programmed to process the SST access manager. The SST access manager has access to one or more networks during its processing. The networks can be wired, wireless, or a combination of wired and wireless.

In an embodiment, the device that executes the SST access manager is an ATM, such as ATM 140 presented above with respect to architecture 100 of the FIG. 1. In another embodiment, the device that processes the SST validator is a kiosk. The SST access manager, in the aforementioned embodiments, can be identified as the security interface module 143 in the FIG. 1.

At 210, the SST access manager detects a secure device presented there to. That is, the SST access manager receives an event notification that a secure device has been interfaced to the SST. This can be, as discussed above, a key dongle 110 (secure device) inserted into a USB port 141 of an ATM 140 (type of SST). The process for this discussion was also discussed above. In another embodiment, the connection is achieved via different secure device that is interfaced to any device port of the SST. In an embodiment, the secure device is a Secure Digital (SD) card.

According to an embodiment, the SST access manager authenticates the secure device to the SST. This can be achieved in a number of manners. One manner was discussed above with reference to the architecture 100. In other embodiments, any credentialing and/or cryptographic approach can be used to authenticate the secure device to the SST.

It is also to be noted that in some embodiments, an inherently insecure device (device that by itself includes no security) can be made a secure device by cryptographic and/or credentialing mechanisms. So, in some embodiments, the secure device is an insecure device that is made to function as a secure device.

At 220, the SST access manager obtains information from the secure device relating to other secure devices that are to be denied access to the SST. In an embodiment, the information is the device invalid identifier list 114 from the architecture 100 of the FIG. 1. In other embodiments, the information can be encrypted keys. In fact, any list of unique data where each unit of that unique data uniquely identifies one of the other secure devices can be used. The information indicates that if a particular secure device is identified therein, then that particular secure device is to be denied access to the SST.

According to an embodiment, at 221, the SST access manager obtains a list of device identifiers for the other secure devices as at least a portion of the information. In an embodiment, the list of device identifiers is the device invalid identifier list 114 of the FIG. 1.

In an embodiment of 221 and at 222, the SST access manager obtains from the secure device a device identifier associated with the secure device. In an embodiment, the device identifier is another portion of the information. In an embodiment, the device identifier is obtained from the secure device independent of the information (which includes just the list of device identifiers). In some cases, the device identifier is validated and acquired before the information is obtained.

In an embodiment of 222 and at 223, the SST access manager checks for a match between the device identifier, which is associated with the secure device any device identifier included within the list of device identifiers.

In an embodiment of 223 and at 225, the SST access manager denies the secure device access to the SST when the match is made. This is an indication that, perhaps, a valid and authorized secure device, is still to be deemed invalid and denied access to the SST.

In an embodiment of 225 and at 226, the SST access manager updates an expiration date on the secure device when the match is made so that the expiration date has expired. This is a mechanism from making a previously valid and authorized secure device an authorized device. In essence, access rights of the secure device are deactivated by setting the expiration date (or attribute on the device identifier) to be set to an expired condition.

In an embodiment of 223 and at 227, the SST access manager requires a person presenting the secure device to provide credentials when the match is made.

In an embodiment of 222 and at 224, the SST access manager checks for a match between the device identifier associated with the secure device and any device identifier in the existing secure device information. In an embodiment, the existing secure device information is the ATM invalid identifier list 144. So, both the lists of device identifiers obtained from the secure device and the SST can be checked to determine if the secure device is to be given access. The order of the two checks 223 and 224 can vary in some embodiments. In an embodiment, the check 224 occurs before 223. Thus, the FIG. 2 and its reference numbering scheme is not intended to impart a required sequence in all embodiments.

At 230, the SST access manager determines whether existing secure device information at the SST is to be updated with the obtained information.

For example, at 231, the SST access manager maintains the existing secure device information when the existing secure device information is more recent than the obtained information. The determination of what is more recent and the mechanisms related thereto were presented above with reference to the FIG. 1.

In another case, at 232, the SST access manager updates the existing secure device information with the obtained information when the obtained information is more recent than the existing secure device information. Again, the determination of what is more recent and the mechanisms related thereto were presented above with reference to the FIG. 1.

According to an embodiment, at 240, the SST access manager transfers the existing secure device information at the SST to the secure device when the existing secure device information is more current than the obtained information from the secure device. So, the SST access manager can update (or request an update via an API, such as device API 142 of the architecture 100) of the secure device in addition to updating its existing secure device information.

One now appreciates how a device, such as a SST, can account for information (tied to accessing an administrative interface of that SST) that is invalid but not necessarily designated as being expired. In addition, the information can be regularly updated each time a secure device is interfaced to the SST, without the need for the SST to use existing networks to acquire the updates. This is particular beneficial when the SST is an ATM as discussed above.

Figure 3:
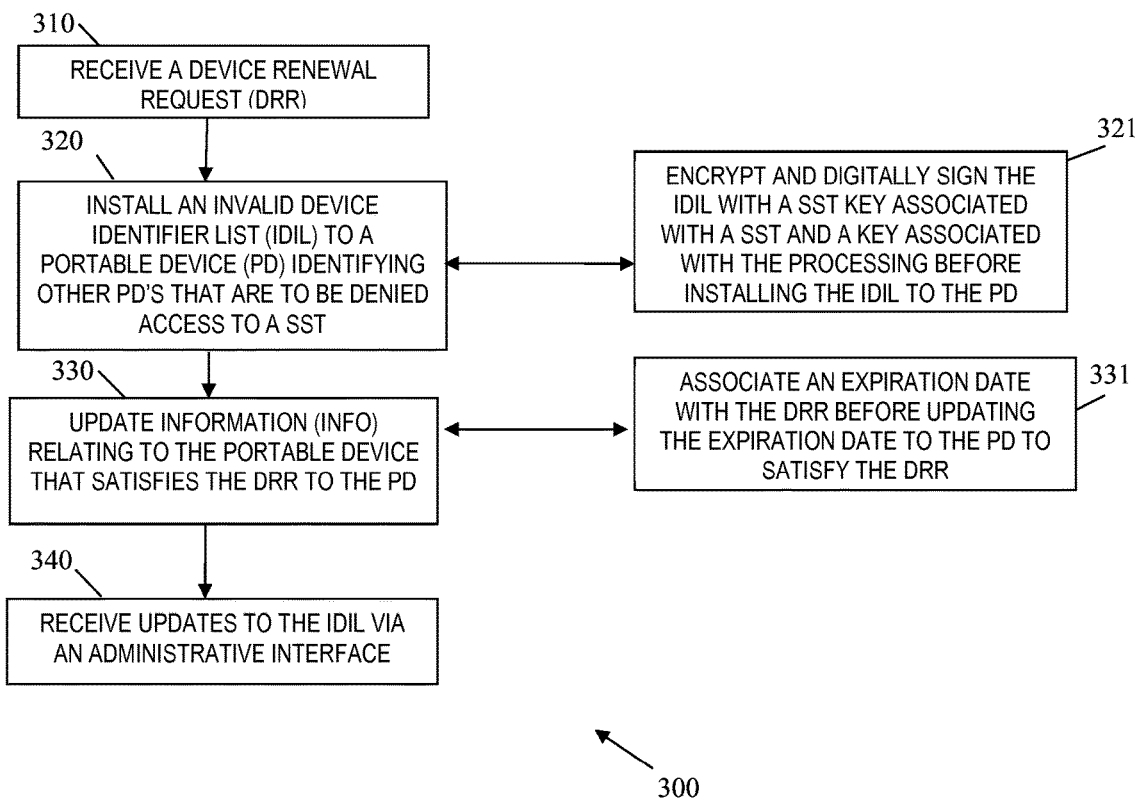
FIG. 3 is a diagram of another method for maintaining secure access to a SST, according to an example embodiment.

FIG. 3 is a diagram of another method 300 for maintaining secure access to a SST, according to an example embodiment. The software module(s) that implements the method 300 is referred to as a "SST identifier distributor." The SST identifier distributor is implemented as executable instructions programmed and residing within memory and/or a non-transitory computer-readable (processor-readable) storage medium and executed by one or more processors of a device. The processors of the device that executes the SST identifier distributor are specifically configured and programmed to process the SST identifier distributor. The SST identifier distributor has access to one or more networks during its processing. The networks can be wired, wireless, or a combination of wired and wireless.

In an embodiment, the device that executes the SST identifier distributor is a server, such as server 130 presented above with respect to architecture 100 of the FIG. 1. The SST identifier distributor, in the aforementioned embodiments, can be identified as at least one portion of the key renewal system 131 in the FIG. 1.

At 310, SST identifier distributor receives a device renewal request. A device includes information thereon that permits authenticated access to a SST to access one or more administrative features of that SST. In an embodiment, the presence of a portable device (secure or made to be secure) when interfaced to another processing device that connects to the server generates the device renewal request. One mechanism for achieving this was discussed above with reference to the FIG. 1.

According to an embodiment, the SST identifier distributor authenticates a requestor associated with the device renewal request and a portable device to which the device renewal request is to be satisfied.

At 320, the SST identifier distributor installs an invalid device identifier list to a portable device that identifies other portable devices that are to be denied access to a SST. This was discussed above.

In an embodiment, at 321, the SST identifier distributor encrypts and digitally signs the invalid device identifier list with a SST key for a SST and with a key associated with the SST identifier distributor. This encryption and signature occur before the invalid device identifier list is installed to the portable device. This is a situation where a portable device is inherently insecure and distribution and use of the invalid device identifier list from the portable device makes the portable device secure during access to the encrypted and signed invalid device identifier list. This may be particular useful with SSTs that lack security or have minimal security mechanisms.

At 330, the SST identifier distributor updates information relating to the portable devices that satisfies the device renewal request to the portable device. The information can be a key, an identifier, or an attribute associated with a key or identifier.

In an embodiment, at 331, the SST identifier distributor associates an expiration date with the device renewal request before updating that expiration date to the portable device to satisfy the device renewal request. This is done by writing the attribute in metadata associated with data on the portable device or by writing the attribute as data on the portable device. The SST is configured to locate and request this attribute from the portable device as discussed above.

According to an embodiment, at 340, the SST identifier distributor receives updates to the invalid device identifier list from an administrative interface operated by an administrator. In another situation, the administrator is an automated software program that performs the update using an API associated with the SST identifier distributor.

In an embodiment, the SST identifier distributor is executed transparent (not visible or noticeable) to a service engineer while a processing device of the service engineer is connected to a network and the processing device is interfaced to the SST identifier distributor.

One now appreciates how the invalid device identifier list is maintained and distributed via a portable device for subsequent update to SSTs (the updating process described above with reference to the FIGS. 1 and 2.). Again, this permits security information that is not necessarily expired, but still determined to be invalid, to be securely distributed indirectly via portable devices that subsequently interface to the SSTs via service engineers that support to those SSTs. This distribution mechanism does not require a network connection by those SSTs to receive the updated invalid device identifier lists.

Figure 4:
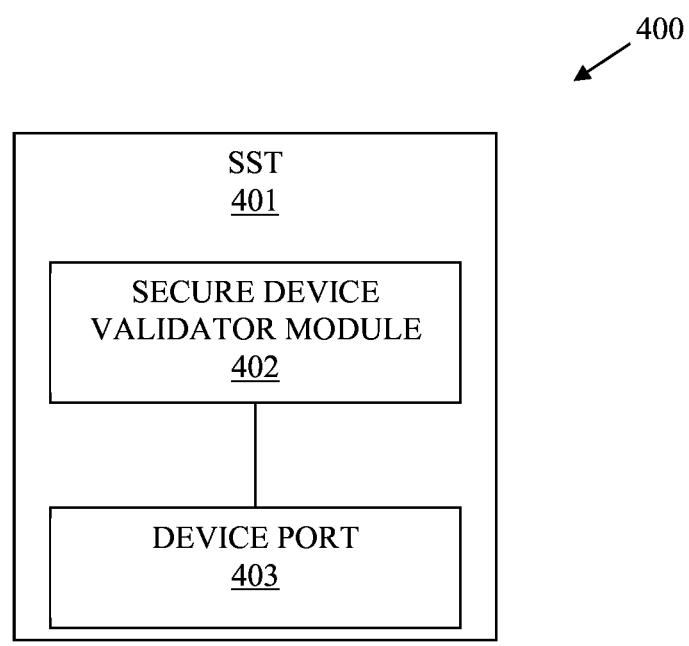
FIG. 4 is a diagram of a SST, according to an example embodiment.

FIG. 4 is a diagram of a SST 400, according to an example embodiment. The components of the SST 400 are programmed and reside within memory and/or a non-transitory computer-readable medium and execute on one or more processors of one or more devices. The SST 400 has access and can communicate over one or more networks; and the networks can be wired, wireless, or a combination of wired and wireless.

The SST 400 includes a SST 401 having a key validator module 402 programmed within memory and/or a non-transitory computer-readable storage media as executable instructions of the SST 400.

In an embodiment, the SST 401 is an ATM.

In another embodiment, the SST 401 is a kiosk.

The key validator module 402 is operable to: detect a secure device interfaced to a device port 403 and determine whether the secure device is to be denied access to restricted portions of the SST 401 by checking if an identifier associated with the secure device matches an identifier on an existing list of invalid identifiers.

According to an embodiment, the secure device is a USB device, such as the key dongle 110 presented above with reference to the architecture 100 of the FIG. 1. In another embodiment, the secure device is inherently insecure and made secure via cryptology and/or credentialing processes. In an embodiment, the secure device is SD card.

According to an embodiment, the key validator module 402 is further operable to ascertain if a list of invalid identifiers retrieved from the secure device is more recent than an existing list of invalid secure identifiers stored by the key validator module 402. The key validator module 402 is also operable to update the existing list of invalid secure device identifiers when the list of invalid secure device identifiers retrieved from the secure device is more recent than the existing list of invalid secure device identifiers.

In an embodiment of the last presented embodiment, the key validator module 402 is further operable to update the list of invalid secure device identifiers stored on the secure device with the existing list of invalid secure device identifiers stored on the secure device when the existing list of invalid secure device identifiers is more recent than the list of invalid secure device identifiers retrieved from the secure device.

According to an embodiment, the key validator module 402 is further configured to deny the secure device access to the SST when an identifier associated with the secure device matches is present in the existing list of invalid secure device identifiers.

In one case of this, the key validator module 402 is further operable to log an access attempt made to access the SST by the secure device.

In an embodiment, the key validator module 402 is further operable to update an expiration date of the secure device when the identifier associated with the secure device matches an identifier on the existing list of invalid secure device identifiers or matches an identifier retrieved from a secure device list of invalid device identifiers on the secure device.

It should be appreciated that where software is described in a particular form (such as a component or module) this is merely to aid understanding and is not intended to limit how software that implements those functions may be architected or structured. For example, modules 131 and 134 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method of maintaining secure access to a Self-Service Terminal (SST), comprising:

detecting, by a SST, a secure device presented thereto, wherein detecting further includes recognizing, by the SST, the secure device connected to the SST through a Universal Serial Bus (USB) port and recognizing the secure device as a USB key dongle that is a portable memory device, and wherein detecting further includes performing a cryptographic authentication on the USB key dongle before granting the USB key dongle access to the SST;

obtaining, by the SST, a list from the secure device relating to additional secure devices that are to be denied access to the SST, deactivated on the SST, and associated with invalid secure devices that are not allowed access to the SST, wherein obtaining the list further includes obtaining from the list, device identifiers associated with the additional secure devices, wherein each device identifier is a device serial number for a particular one of the additional secure devices, and wherein each device identifier in the list includes a modifiable attribute representing an expiration date, and wherein the additional secure devices are additional USB key dongles;

determining, by the SST, whether existing secure device information at the SST that represents invalid secure device identifiers is to be updated with the list having the device serial numbers and the corresponding expiration dates, and updating the existing secure device information at the SST with the list when the list is more recent than the existing secure device information, wherein determining further includes calculating each expiration date when processing the updating for each device identifier based on an issuance date and a time-to-live attribute; and processing the method, by the SST, without the SST having a network connection.

2. The method of claim 1 further comprising, checking for matches between a device identifier associated with the secure device and any device identifier in the list of the device identifiers.

3. The method of claim 2, wherein checking further includes denying the secure device access to the SST when a match is made.

4. The method of claim 3 further comprising, updating an expiration date on the secure device when the match is made to indicate that the expiration date has expired for the secure device.

5. The method of claim 2 further comprising, requiring a person presenting the secure device to provide valid credentials when the match is not made.

6. The method of claim 1 further comprising, checking for matches between a device identifier associated with the secure device and any device identifier in the existing secure device information at the SST.

7. The method of claim 1 further comprising, transferring the existing secure device information at the SST to the secure device when the existing secure device information is more current than the list provided from the secure device.

8. The method of claim 1, wherein determining further includes maintaining the existing secure device information at the SST when the existing secure device information is more recent than the list.

9. A Self-Service Terminal (SST), comprising:
 a device port that is a Universal Serial Bus (USB) port; and
 a secure device validator module operable to:
  (i) detect a secure device interfaced to the device port, wherein the secure device is a USB key dongle that is a portable memory device;
  (ii) determine whether the secure device is to be denied access to restricted portions of the SST by checking if an identifier associated with the secure device matches an identifier on an existing list of invalid identifiers and perform a cryptographic authentication on the USB key dongle before granting the USB key dongle access the SST, wherein the identifier is a unique serial number for the USB key dongle and wherein each invalid identifier is a specific unique serial number for a specific USB key dongle, and wherein the identifier and each invalid identifier includes modifiable attributes for expiration dates, wherein the secure device validator module is configured to process while the SST does not have a network connection;
  (iii) ascertain if a list of invalid identifiers retrieved from the secure device is more recent than an existing list of invalid secure identifiers stored by the secure device validator module; and
  (iv) update the existing list of invalid secure device identifiers with the expiration dates when the list of invalid secure device identifiers retrieved from the secure device is more recent than the existing list of invalid secure device identifiers and deny access to any subsequent secure device that is subsequently interfaced to the SST when the subsequent secure device is associated with one of the updated existing list of invalid secure device identifiers, wherein the secure device validator is further configured in (iv) to: calculate each expiration date during any update for each invalid secure device identifier based on an issuance date and a time-to-live attribute.

10. The SST of claim 9, wherein the secure device validator module operable to: (v) update the list of invalid secure device identifiers stored on the secure device with the existing list of invalid secure device identifiers stored on the secure device when the existing list of invalid secure device identifiers is more recent than the list of invalid secure device identifiers retrieved from the secure device.

11. The SST of claim 9, wherein the secure device validator module is further operable to: (v) deny the secure device access to the SST when the identifier associated with the secure device is present in the existing list of invalid secure device identifiers.

12. The SST of claim 9, wherein the secure device validator module is further operable to: (v) update the expiration date of the secure device when the identifier associated with the secure device matches an identifier on the existing list of invalid secure device identifiers or matches an identifier retrieved from secure device list of invalid device identifiers on the secure device.

* * * * *